United States Patent [19]

Stenlund

[11] Patent Number: 5,072,784
[45] Date of Patent: Dec. 17, 1991

[54] HEAT EXCHANGER ARRANGEMENT FOR COOLING A MACHINE

[75] Inventor: Stig Stenlund, Bataljvägen, Sweden

[73] Assignee: Stenhex Aktiebolag, Saltsjöbaden, Sweden

[21] Appl. No.: 501,320

[22] Filed: Mar. 29, 1990

Related U.S. Application Data

[63] Continuation of Ser. No. 224,948, Jul. 28, 1988, abandoned, which is a continuation-in-part of Ser. No. 847,659, Feb. 25, 1986, Pat. No. 4,923,003.

[30] Foreign Application Priority Data

Feb. 24, 1987 [SE] Sweden .................. 8700774-6
Feb. 18, 1988 [SE] Sweden ......... PCT/SE88/00071

[51] Int. Cl.$^5$ .................. F28D 9/00; F01D 11/08
[52] U.S. Cl. .................. 165/47; 165/164; 165/168; 165/916; 184/104.1; 184/6.22; 184/6.12; 73/606
[58] Field of Search ............ 165/47, 916, 51, 164, 165/168; 184/104.3, 6.22, 6.12, 104.2, 104.1, 13.1, 11.1, 11.2, 11.3; 73/606 A; 123/196 AB

[56] References Cited

U.S. PATENT DOCUMENTS

| | | | |
|---|---|---|---|
| 1,749,077 | 3/1930 | Kennedy | 184/6.12 |
| 1,942,101 | 1/1934 | Howarth | 184/6.22 |
| 2,687,784 | 8/1954 | Klackner | 184/104.1 |
| 2,802,548 | 8/1957 | Mart et al. | 184/6.22 |
| 3,529,698 | 9/1970 | Nelson | 184/6.12 |
| 3,891,059 | 6/1975 | Jones | 184/104.3 |
| 4,058,980 | 11/1977 | Ahlen | 165/916 |
| 4,150,655 | 4/1979 | Gaggiano et al. | 184/104.3 |
| 4,445,592 | 5/1984 | New et al. | 184/6.22 |
| 4,923,003 | 5/1990 | Stenlund | 165/154 |

FOREIGN PATENT DOCUMENTS

| | | | |
|---|---|---|---|
| 219352 | 1/1962 | Austria | 184/6.22 |
| 3606963 | 9/1986 | Fed. Rep. of Germany | 184/6.12 |

*Primary Examiner*—John Ford
*Attorney, Agent, or Firm*—Browdy and Neimark

[57] ABSTRACT

A heat exchanger (4) for cooling a machine, such as a mechanical gear or some other transmission component, hydraulic pump, motor or clutch, compressor, internal combustion engine or like machine, which comprises a housing (1) in which movable, mechanical elements (2), which are driven when the machine is working, are housed, and which encloses a liquid medium (3), such as a lubricating or hydraulic liquid. The heat exchanger is mounted in the outer wall (5) of the housing and comprises two chambers (6, 7) which are mutually separated by a liquid-impervous partition wall (8) which comprises part of the housing wall. The inwardly located chamber (7) is through-passed by the liquid medium (3) enclosed in the housing, while the outwardly located chamber (6) is through-passed by a cooling medium. The heat exchanger (4) is so positioned that a pressure difference is created between the inlet (13) and the outlet (16) of the inwardly located chamber (7) under the influence of movement of the movable mechanical elements (2) therewith obviating the need of a separate pump for driving the medium (3) to be cooled through the heat exchanger.

9 Claims, 2 Drawing Sheets

HEAT EXCHANGER ARRANGEMENT FOR COOLING A MACHINE

This is a continuation of application Ser. No. 07/224,948, filed Jul. 28, 1988, now abandoned, which is a Continuation-in-Part of application Ser. No. 06/847,659, filed Feb. 25, 1986, now issued as U.S. Pat. No. 4,923,003, on May 8, 1991.

The present invention relates to a heat-exchange arrangement for cooling a machine. The term machine is used in the present context as a collective designation for machines or machine assemblies of the kind which include a housing in which movable components which are driven when the machine is working are housed and which encloses a liquid medium, normally a lubricant or hydraulic fluid. Examples of machines of this kind include internal combustion engines, gear assemblies, automatic gear-boxes, mechanical and hydraulic clutches, other kinds of transmission elements, hydraulic pumps, hydraulic motors, compressors, etc.

In many of these machines there exists the need to cool the liquid working in the machine. Conventional heat exchangers which might conceivably be considered for use to this end work with turbulent flow. When wishing to use a turbulent-flow heat exchanger which is light in weight and small in volume and yet exhibits a high heat-exchange efficiency, the heat exchanger must operate at a relatively high pressure-drop and, in many cases, with a relatively high volumetric through-flow of the enclosed liquid medium to be cooled. Consequently, a pump must be provided to produce the requisite high drop in pressure and a sufficiently large volumetric flow of medium. Many of the aforementioned machines, however, lack the provision of a pump for driving the enclosed liquid medium to be cooled, or in those cases where a pump is fitted, the pump has other primary duties to fulfill and cannot therefore satisfy the requirements of the heat exchanger with regard to pressure and volumetric flow of the liquid concerned. One example in this respect includes the automatic gear boxes of automotive vehicles, in which the primary purpose of the pump provided is to supply the hydraulic transmission system with the requisite pressure and the requisite flow of fluid. The development of machines of the above-mentioned kind is also directed towards machines of progressively higher power and of more compact construction, and consequently of smaller volume, or bulk, and smaller surface areas. As a result the machines will have low inherent cooling abilities. Examples of this are motor vehicle transmission components, where the need, e.g. of cooling simple mechanical gears and gear boxes has become progressively greater. To supply such machines, which either need no pump for their main function or which incorporate a pump which produces only relatively limited pressure and only a relatively small volumetric flow, with a separate pump in order to satisfy the requirement of a conventional turbulent-flow heat exchanger to effect the desired cooling of the machine would cause considerable technical complications and add greatly to the overall costs. Because of this, machines of this kind have hitherto not normally been provided with separate cooling arrangements, and consequently it has been necessary to accept very high machine temperatures and the problems caused thereby.

The object of the present invention is therefore to provide a heat exchanger arrangement for cooling machines of the aforementioned kind which is of simple and inexpensive construction and the function of which does not require the provision of a separate pump for moving the liquid medium to be cooled through the heat exchanger, but which will nevertheless afford a very high heat exchange effect and therewith effective cooling.

The characteristic features of a heat exchanger arrangement constructed in accordance with the invention are set forth in the following claims.

The invention will now be described in more detail with reference to the accompanying schematic drawings, which illustrate a number of exemplifying embodiments of the invention and in which FIG. 1 is a sectional view of a first embodiment of the invention;

Figure 1:
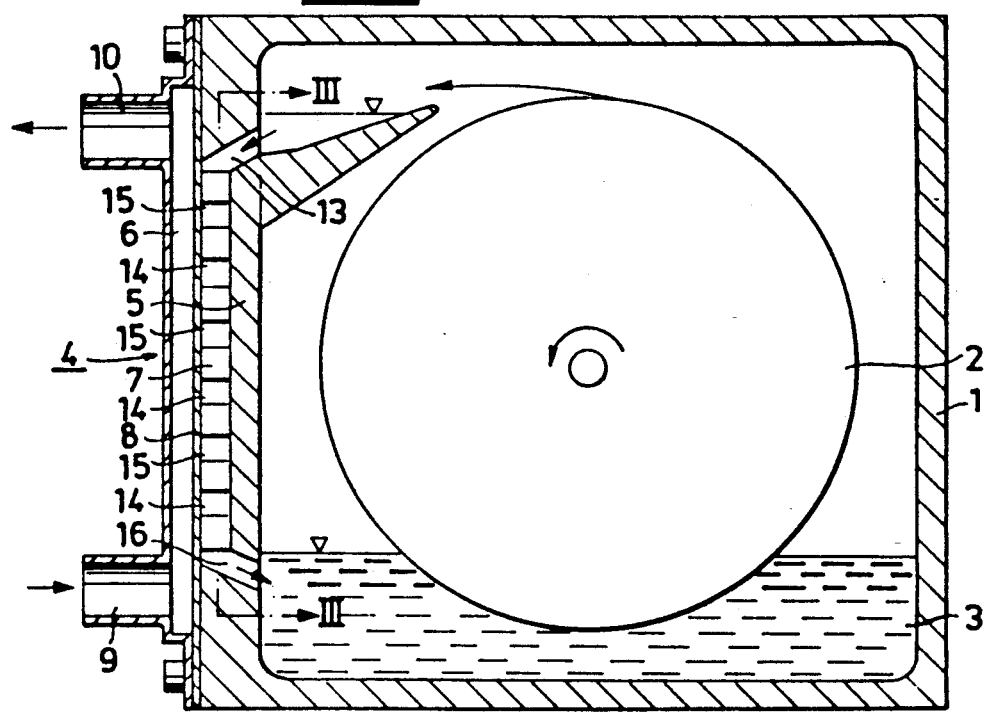
Figure 3:
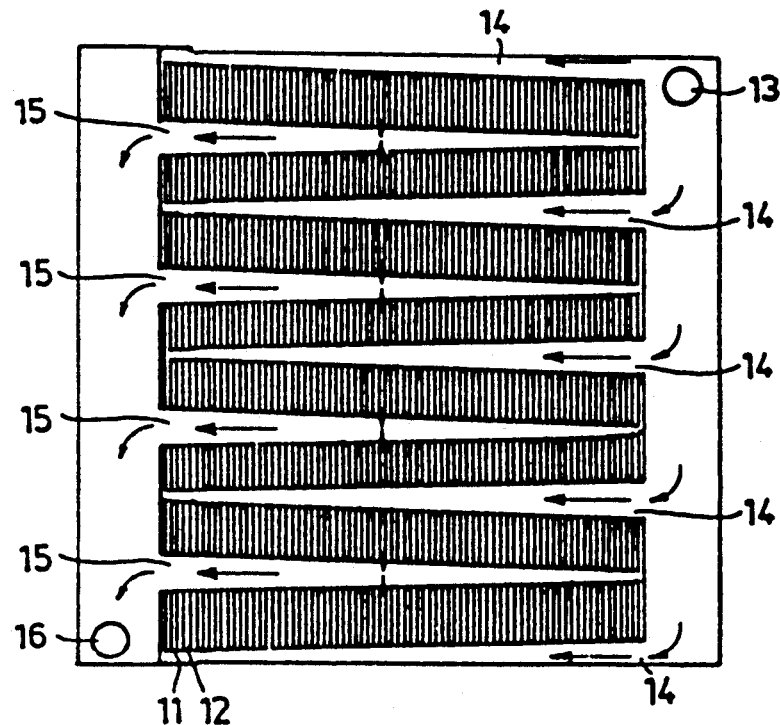
FIG. 3 is a sectional view taken on the line III—III in FIG. 1.

FIGS. 1 and 3 illustrate very schematically and by way of example one conceivable embodiment of the invention. FIG. 1 is a schematic sectional view of a machine of the aforedescribed kind which includes a housing 1 in which movable mechanical elements 2 are housed, these elements being driven when the machine is working, and which includes a liquid medium 3, such as a lubricant or hydraulic fluid. Since the actual construction of the machine is not relevant to the present invention, there is no need to describe the machine in detail, and hence the machine is only illustrated schematically and in principle. The machine may, for instance, consist of a gear box or some other form of transmission component of an automotive vehicle, which gear box or transmission component includes rotating gears and shafts and also incorporates lubricating oil.

In accordance with the invention, the machine is cooled by means of an inventive heat exchanger arrangement, generally referenced 4, which is fitted in one of the external walls 5 of the machine housing 1. The heat exchanger arrangement 4 includes two chambers 6 and 7 which are mutually separated by a liquid-impervious partition wall 8, which forms a part of the liquid-impervious wall of the machine housing 1. The heat-exchange chamber 7, located inwardly of the partition wall 8, is intended to be through-passed by the liquid 3 enclosed by the housing 1 and for cooling the machine, whereas the chamber 6, located outwardly of the partition wall 8 is intended to be through-passed by a coolant, e.g. water, which is delivered to the chamber 6 through an inlet 9 and leaves through an outlet 10. The transfer of heat between the liquid 3 and the coolant thus takes place through the liquid-impervious partition wall 8. The heat transfer from the liquid 3 when the liquid flows through the chamber 7 in the heat exchanger and past the partition wall 8 takes place in accordance with the heat-exchange principle taught by International Patent Application PCT/SE 84/00245, corresponding to U.S. application Ser. No. 06/847,659 with laminar flow of the liquid 3 in the heat-exchange chamber 7. To this end, the inner surface of the partition of fins 11 which define therebetween a large number of flow channels 12 which present an elongated rectangular, slot-like cross section and which are connected in parallel with regard to the flow of liquid therethrough (c.f. FIG. 3). The chamber 7 has an inlet 13 through which the liquid 3 enters the chamber and from which the liquid is conducted, via distribution or auxiliary channels 14 of relatively large flow area, to a very large number of narrow flow channels 12 defined by mutually adjacent fins 11. Subsequent to passing through the narrow flow channels 12, the liquid 3 is conducted through auxiliary channels or collecting channels 15 of relatively large flow areas to an outlet 16, through which the liquid leaves the chamber 7. The liquid flow through the channels 12 is laminar and the channels have a short length, for instance, a length of 5–20 mm. Because of the large number of flow channels present, each of which conducts a very small volumetric flow of liquid, this will afford only a small drop in pressure. The relatively large auxiliary channels 14, 15 do not give rise to any appreciable drop in pressure, and as a result of the very large number of narrow flow channels 12 provided there is obtained, relatively speaking, a very large total volumetric flow through the chamber 7 at a very low total pressure drop from the inlet 13 to the outlet 16. As a result of the relatively large total volumetric flow and the extremely good heat-exchange characteristics of a heat exchanger constructed in this manner, there is achieved a fully satisfactory heat-exchange effect without requiring the provision of a separate pump to drive the liquid 3 through the chamber 7 of the heat exchanger. Thus, the requisite flow of liquid 3 through the chamber 7 of the heat exchanger can be achieved in the manner illustrated in FIG. 1, by arranging and positioning the heat exchanger so that the inlet 13 through which the liquid 3 enters the chamber 7 is located at a higher level than the chamber outlet 16, and so that when the machine is working, the liquid 3 is transported to the higher level of the inlet 13 under the influence of the movement of the movable mechanical elements 2, e.g. as a result of the rotary movement of a rotating gear or like element. The resultant hydrostatic pressure differential obtained in this way between the inlet 13 and the outlet 16 is fully sufficient to drive the requisite volume of liquid through the chamber 7 of the heat exchanger. Movement of the liquid 3 through the heat exchanger is also assisted by the increase in density experienced by the liquid as it is gradually cooled during its passage through the chamber 7.

The outwardly located heat-exchange chamber 6 through which the cooling medium flows may be configured for turbulent flow in a conventional manner, since normally there is access to a pump which is capable of producing the pressure required to drive a sufficient volume of cooling medium in general through a turbulent-flow heat-exchange chamber. Consequently, the partition wall 8 of the heat exchanger 4 may be provided with a plurality of mutually parallel fins which extends from the inlet 9 to the outlet 10 and which define therebetween a plurality of cooling medium flow channels extending from the cooling medium inlet 9 to the cooling-medium outlet 10. This enhances the heat-exchange effect between the cooling medium and the partition wall 8 in a conventional fashion. It will be understood, however, that the outer heat-exchange chamber 6 for cooling medium may also be configured for laminar flow of the cooling medium in accordance with the heat-exchange principle taught by the International Patent Application PCT/SE 84/00245.

The liquid medium to be cooled and enclosed in the machine housing may also be driven through the inwardly located heat-exchange chamber configured for laminar flow under the influence of a hydrodynamic pressure differential created by movement of the movable mechanical machine elements when the machine is working. One such embodiment of the invention is illustrated schematically and by way of example in FIG. 2, in which the same references as those used in FIG. 1 have been used to identify corresponding parts.

Figure 2:
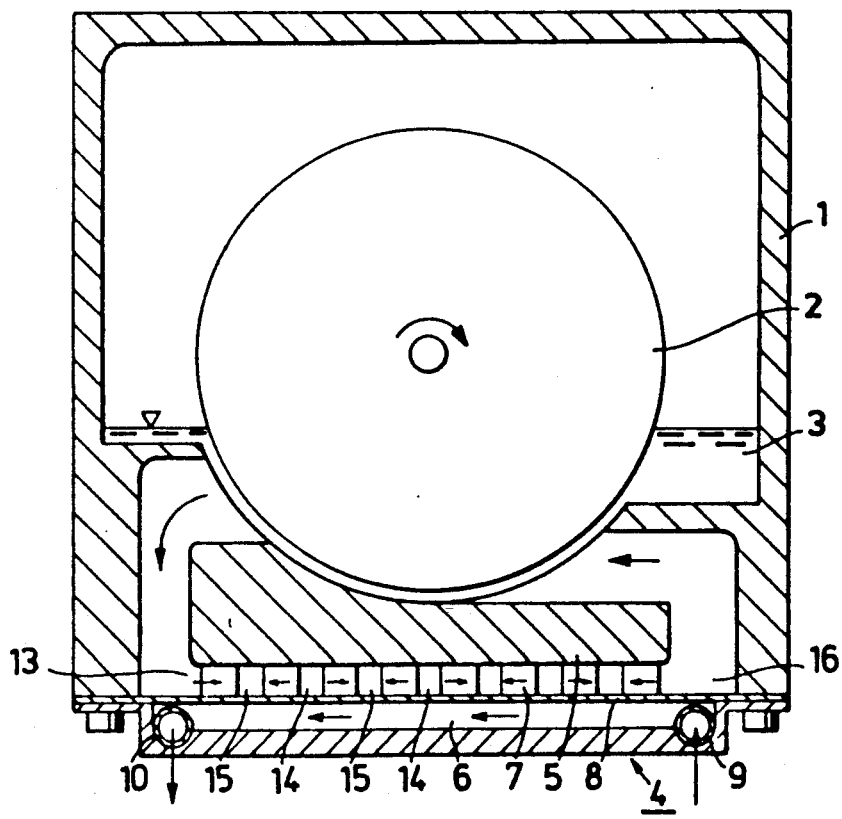
FIG. 2 is a sectional view of a second embodiment of the invention.

In the exemplifying embodiments illustrated in FIGS. 1–3, the auxiliary channels 14, 15 in the inner heat-exchange chamber 7 configured for laminar flow of the cooling medium 3 are placed within the chamber 7 in the form of interruptions in the fins 11 which define therebetween the laminar flow channels 12. Alternatively, however, these auxiliary channels 14, 15, which serve as distribution and collection channels respectively, may be placed in the housing wall 5 located inwardly of the chamber 7, in the manner illustrated schematically in FIG. 4. This obviates the need for corresponding interruptions in the fins 11 defining the laminar flow channels 12, and hence there is obtained a greater fin length and therewith also a greater flow channel length, which results in a greater heat-exchange effect.

Figure 4:
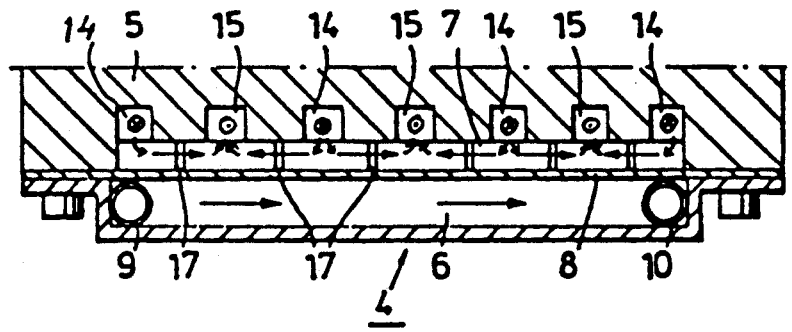
FIG. 4 is a sectional view of a further embodiment of the invention.

In FIG. 4, symbols indicate the direction of flow through the distribution channels 14 and the collecting channels 15 as well as the direction of flow between these channels 14, 15, and the laminar flow channels 12 defined between the fins 11 in the heat-exchange chamber 7. It should be noticed that the cross-section through the heat exchanger shown in FIG. 4 is taken along a plane perpendicular to the longitudinal extension of the channels 14 and 15. The only principal difference between the embodiment illustrated in FIG. 4 and the embodiment illustrated in for instance, FIGS. 1 and 3 is that, whereas in the FIG. 1, 3 embodiment the distribution channels 14 and the collecting channels 15 are formed as interruptions in the fins 11 defining the laminar flow channels 12, the distribution channels 14 and the collecting channels 15 in the embodiment of FIG. 4 are instead formed as open grooves in the housing wall 5 which is located close to and covering the heat-exchange chamber 7 with its fins 11 and intermediate laminar flow channels 12. This means that the fluid enters the distribution channels 14 and flows in the longitudinal direction of these channels 14 while at the same time being distributed into the laminar flow channels 12 between the fins 11. From these laminar flow channels 12 the fluid flows into the collecting channels 15 through which the fluid is discharged in the longitudinal direction of these channels 15.

As described in the aforementioned international patent application, the fins 11 may be broken with short slotlike interruptions, referenced 17 in FIG. 4, for the purpose described in said international patent application.

I claim:

1. An arrangement for cooling a machine which comprises a housing (1) in which movable, mechanical elements (2), which are driven when the machine is working, are housed, and which encloses a liquid medium (3), characterized in that the arrangement includes a heat exchanger (4) which is arranged in a part of one external wall (5) of the housing (1) and which includes two chambers (6, 7) which are mutually separated by a liquid-impervious partition wall (8) which constitutes a part of the liquid-impervious wall of the housing (1); in that the chamber (6) located outwardly of the partition wall (8) is adapted to be through-passed by a cooling medium, whereas the chamber (7) located inwardly of the partition wall (8) is adapted to be through-passed by the liquid medium (3) enclosed in the housing (1); in that the inwardly located chamber (7) incorporates a large number of flow channels (12) which are connected in parallel with regard to the flow of the liquid medium therethrough; in that the flow channels (12) have a narrow rectangular cross-sectional shape dimensioned for laminar flow of the liquid medium therethrough and are defined by fins (11) formed integrally with the partition wall (8); in that the one respective ends of the flow channels communicate with an inlet (13) to the chamber (7) via distribution channels (14), whereas the other respective ends of the flow channels communicate with an outlet (16) from the chamber (7) via collecting channels (15); and in that the heat exchanger (4) is so positioned in the housing (1) that the inlet (13) and the outlet (16) for the chamber (7) located inwardly of the partition wall (8) have a mutual position such that when the machine is working, the liquid medium (3) will flow through the chamber (7), from the chamber inlet (13) to the chamber outlet (16), under the influence of the movement of the mechanical elements (2) housed in said housing.

2. An arrangement according to claim 1, characterized in that the inlet (13) to the chamber (7) is located on a higher level than the outlet (16); and including means for raising the liquid medium (3) to the inlet (13) under the influence of the movement of the mechanical element (2).

3. An arrangement according to claim 1, comprising means for moving the mechanical elements (2) for engendering a hydrodynamic pressure difference between the inlet (13) and the outlet (16) of said chamber (17).

4. An arrangement for cooling a machine, which comprises a housing having liquid-impervious walls and enclosing a liquid medium which is being heated as a result of the operation of the machine and which needs to be cooled, said arrangement including a heat exchanger having a first heat-exchange chamber and a second heat-exchange chamber mutually separated by a liquid-impervious partition wall constituting a part of the liquid-impervious walls of said housing, said second heat-exchange chamber being located externally of said partition wall and having an inlet and outlet for a flow of a cooling liquid medium, said first heat-exchange chamber being located internally of said partition wall and having at least one inlet and at least one outlet for a flow of said liquid medium to be cooled, said first heat-exchange chamber incorporating a plurality of flow channels connected in mutual parallel relationship with regard to said flow of said liquid medium to be cooled and each having a narrow rectangular cross-sectional shape dimensioned for laminar flow of the liquid medium therethrough and having a length not exceeding 20 mm and being defined by fins formed integrally with and projecting perpendicular from said partition wall, said first heat-exchange chamber further incorporating a number of distribution channels having a substantially larger cross-sectional area than said flow channels and extending substantially perpendicular to said flow channels and forming a flow communications between upstream ends of said flow channels and said inlet of said first heat-exchange chamber and further a number of collecting channels having a substantially larger cross-sectional area than said flow channels and extending substantially perpendicular to said flow channels and forming flow communications between downstream ends of said flow channels and said outlet of said first heat-exchange chamber, said inlet and said outlet of said first heat-exchange chamber communicating with interior of said housing and with said liquid medium enclosed therein at respective locations between which a pressure difference for driving a sufficient flow of said liquid medium to be cooled through said first heat-exchange chamber is created solely as a result of the operation of said machine without the aid of any additional pumping means not required for the intrinsic operation of the machine as such.

5. An arrangement as claimed in claim 4, wherein said pressure difference is due to a difference in elevation of said liquid medium to be cooled at said inlet and outlet respectively of said first heat-exchange chamber, said difference in elevation being created and maintained by the operation of said machine.

6. An arrangement as claimed in claim 4, wherein said pressure difference is due to a kinetic energy of said liquid medium to be cooled created and maintained by the operation of said machine.

7. An arrangement as claimed in claim 4, wherein said pressure difference is due to a difference in density caused by a difference in temperature of said liquid medium to be cooled at said inlet and outlet respectively of said first heat-exchange chamber, said difference in density and temperature being created and maintained by the operation of said machine.

8. An arrangement as claimed in claim 4, wherein said distribution channels and collecting channels are formed by interruptions in said fins.

9. An arrangement for cooling a machine, which comprises a housing having liquid-impervious walls and enclosing a liquid medium which is being heated as a result of the operation of the machine and which needs to be cooled, said arrangement including a heat exchanger having a first heat-exchange chamber and a second heat-exchange chamber mutually separated by a liquid-impervious partition wall constituting a part of the liquid-impervious walls of said housing, said second heat-exchange chamber being located externally of said partition wall and having an inlet and outlet for a flow of a cooling liquid medium, said first heat-exchange chamber being located internally of said partition wall and having at least one inlet and at least one outlet for a flow of said liquid medium to be cooled, said first heat-exchange chamber incorporating a plurality of flow channels connected in mutual parallel relationship with regard to said flow of said liquid medium to be cooled and each having a narrow rectangular cross-sectional shape dimensioned for laminar flow of the liquid medium therethrough and having a length not exceeding 20 mm and being defined by fins formed integrally with and projecting perpendicular from said partition wall, said first heat-exchange chamber further incorporating a number of distribution channels having a substantially larger cross-sectional area than said flow channels and extending substantially perpendicular to said flow channels and forming a flow communications between upstream ends of said flow channels and said inlet of said first heat-exchange chamber and further a number of collecting channels having a substantially larger cross-sectional area than said flow channels and extending substantially perpendicular to said flow channels and forming flow communications between downstream ends of said flow channels and said outlet of said first heat-exchange chamber communicating with interior of said housing and with said liquid medium enclosed therein at respective locations between which a pressure difference for driving a sufficient flow of said liquid medium to be cooled through said first heat-exchange chamber is created solely as a result of the operation of said machine without the aid of any additional pumping means not required for the intrinsic operation of the machine as such, said distribution and collecting channels formed by grooves in a liquid-impervious wall member extending across and covering the free edge of said fins and the flow channels defined therebetween.

* * * * *